United States Patent
Woo

(10) Patent No.: US 7,835,025 B2
(45) Date of Patent: Nov. 16, 2010

(54) PROCESSING SYSTEM AND METHOD OF PROCESSING PATTERN BITMAP DATA FOR PRINTER

(75) Inventor: Hong-rok Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1338 days.

(21) Appl. No.: 11/334,381

(22) Filed: Jan. 19, 2006

(65) Prior Publication Data

US 2006/0164668 A1 Jul. 27, 2006

(30) Foreign Application Priority Data

Jan. 21, 2005 (KR) .................. 10-2005-0005933

(51) Int. Cl.
*G06F 15/00* (2006.01)
*G06K 9/00* (2006.01)
(52) U.S. Cl. .................................. 358/1.16; 382/144
(58) Field of Classification Search ............... 358/1.16, 358/1.15, 1.13, 540, 1.18, 534, 1.11, 401, 358/3.23, 3.27, 465, 3.18, 463, 447, 443; 382/144, 254, 183, 209, 269, 299; 400/323, 400/279; 235/462.1, 462.11, 462.08; 347/16, 347/41, 131, 133
See application file for complete search history.

(56) References Cited

U.S. PATENT DOCUMENTS

| 5,801,843 A | * | 9/1998 | Overton ..................... 358/447 |
| 6,026,239 A | * | 2/2000 | Patrick et al. ............... 717/154 |
| 6,091,418 A | * | 7/2000 | Smith et al. .................. 345/418 |

FOREIGN PATENT DOCUMENTS

| JP | 3-176169 | 7/1991 |
| JP | 4-205622 | 7/1992 |
| JP | 2000-71540 | 3/2000 |
| KR | 1996-15761 | 11/1996 |

* cited by examiner

*Primary Examiner*—Saeid Ebrahimi Dehkordy
(74) *Attorney, Agent, or Firm*—Stanzione & Kim, LLP

(57) ABSTRACT

A processing system to process pattern bitmap data for a printer includes a memory to store pattern bitmap data, a pattern arranging unit to arrange the pattern bitmap data in a size appropriate for a data processing unit in which the pattern bitmap data can be processed at a time, a pattern dividing unit to divide the pattern bitmap data into a first region having a size appropriate for the data processing unit and a second region having a size not appropriate for the data processing unit, and a pattern handler to write/read the pattern bitmap data in/from the memory, wherein the first region is read and written according to the processing unit, and the second region is read and written using one or more units smaller than the data processing unit, such that a processing time of pattern bitmaps is reduced and occurrences of errors (exceptions) in a CPU is prevented.

10 Claims, 3 Drawing Sheets

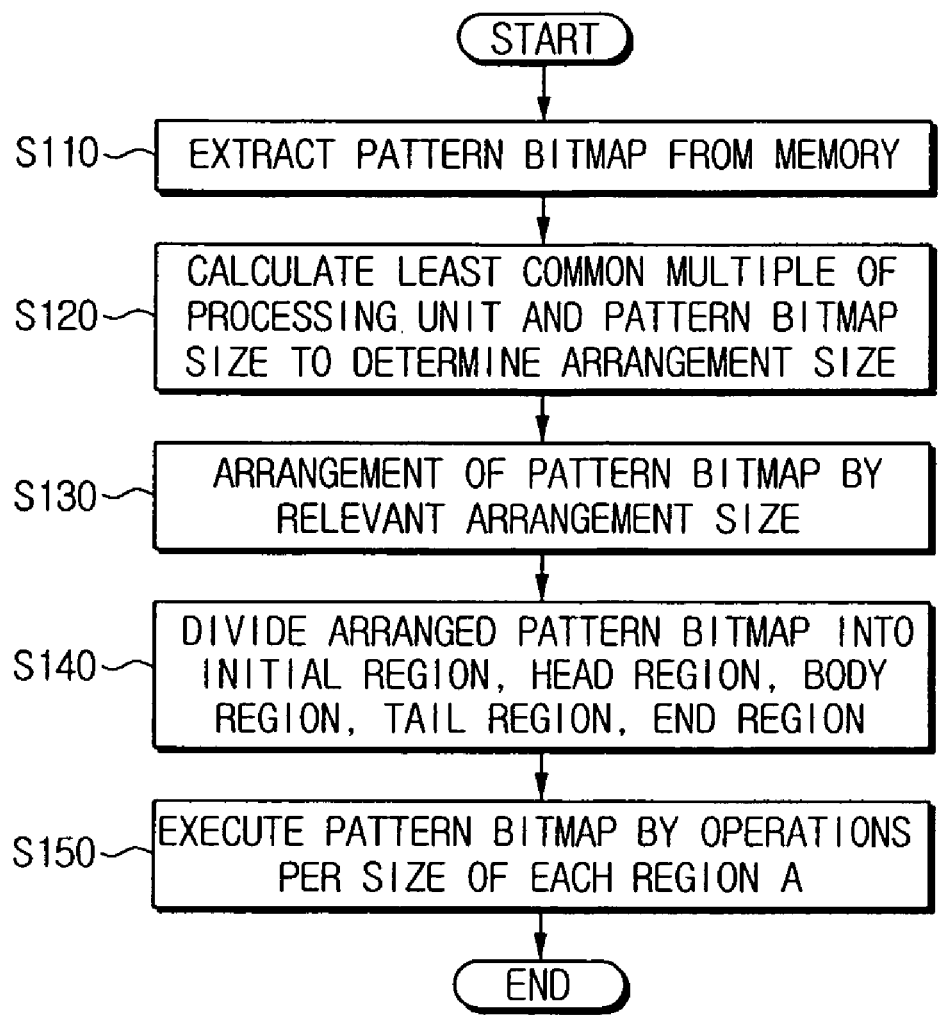

PROCESSING SYSTEM AND METHOD OF PROCESSING PATTERN BITMAP DATA FOR PRINTER

CROSS-REFERENCE TO RELATED APPLICATIONS

This application claims the benefit under 35 U.S.C. §119 of Korean Patent Application No. 2005-5933, filed on Jan. 21, 2005, in the Korean Intellectual Property Office, the entire content of which is incorporated herein by reference.

BACKGROUND OF THE INVENTION

1. Field of the Invention

The present general inventive concept relates to a processing system and method of processing pattern bitmap data for an image forming apparatus, such as a printer, and more particularly, to a processing system and method of processing pattern bitmap data for a printer adapted to divide the pattern bitmap data into data processing units, thereby enabling to improve a processing speed when the pattern bitmap data is read and written.

2. Description of the Related Art

Generally, when a user uses an application program of a terminal, such as a computer, to prepare characters, pictures and the like, and executes a print-out operation in a printer, a printer driver provides print data to be printed to the printer. The printer driver serves to convert the characters, pictures and the like prepared by the application program of the computer to the print data in a printer language interpretable by the printer.

The print data generated in the printer language by the printer driver is transmitted to the printer, and converted to bitmap data printable by the printer. The conversion process of the print data into the bitmap data is explained in detail hereinbelow.

First, an interpreter converts the print data to a printer inner language, and the print data converted to the printer inner language is divided into data processible by a decoder using a command parser. The divided data is decoded by the decoder.

The decoded data includes information relative to a source image, a pattern, a destination and a raster operation (ROP) and is converted into a bitmap graphic format. The "source image" denotes information relative to profiles, such as characters or pictures, included in the print data. The "pattern" denotes information relative to shades, slanting lines, and colors of characters or pictures. The "destination" denotes information relative to background, and the "ROP" denotes information relative to logical operation for each source image.

The decoded data is converted into bitmap data by a graphic processor, and stored in a memory per bit for printing by using an intrinsic illustration such as a symbolic command. The graphic processor converts source images, patterns and destinations to a bitmap format to generate a source image bitmap, a pattern bitmap and a destination bitmap, respectively, and generates final bitmap data using a logical operation designated by the ROP out of 256 logical operations.

Meanwhile, pattern data contained in the decoded data includes information relative to types of patterns and addresses, and the pattern data is stored in a memory of a printer. For that reason, the graphic processor extracts a relevant pattern bitmap from the memory during a logical operation. The pattern bitmap (also referred to as pattern bitmap data) generated by the graphic processor is temporarily stored in the memory, extracted again and printed.

However, when the pattern bitmap data is stored in the memory, the pattern bitmap data is stored at a position in proportion to where a pattern is printed out on a printing paper. For example, if pattern bitmap data is a 12 byte, and 5 bit length, and an address is a position which is a 30th bit with respect to a reference as a starting position, as illustrated in FIG. 1, storage must be arranged so that the pattern bitmap data begins from the bit 30 position. 2 bits are stored before 12 bytes, and then 3 bits are stored after 12 bytes.

At this time, because the pattern bitmap data has not started from a multiple byte position, and since the start position is the bit 30 position, the pattern bitmap data should be stored in a memory per bit for the entire length of 12 bytes and 5 bits.

In other words, for storing the pattern bitmap data having the 12-byte 5-bit length, a 101-bit writing operations (12 bytes×8 bits/byte+5 bits=96 bits+5 bits=101 bits) should be executed. Similarly, when extracting the pattern bitmap data from the memory, 101 bit-reading operations have to be performed.

According to a conventional method described above, when pattern bitmap data is stored in a memory from a graphic processor and then the pattern bitmap data is extracted from the memory, bit operations frequently occur where the pattern bitmap data is stored and extracted per bit, such that it takes a lot of time to store the pattern bitmap data in the memory and to extract the pattern bitmap data from the memory. In other words, there is a disadvantage in that it takes a relatively long time for a print-out to be executed.

In order to solve the afore-mentioned disadvantage, it becomes necessary to find a method for shortening a rendering time of the pattern bitmap data stored in the memory.

SUMMARY OF THE INVENTION

The present general inventive concept provides a processing system and method of processing pattern bitmap data for a printer to prevent a bit operation from occurring during rendering of pattern bitmap data, thereby enabling to shorten a rendering time and to execute a swift print-out operation.

Additional aspects and advantages of the present general inventive concept will be set forth in part in the description which follows and, in part, will be obvious from the description, or may be learned by practice of the general inventive concept.

The foregoing and/or other aspects of the present general inventive concept may be achieved by providing a processing system to process pattern bitmap data for a printer, the processing system including a memory to store pattern bitmap data, a pattern arranging unit to arrange the pattern bitmap data in a size appropriate for a data processing unit in which the pattern bitmap data to be processed at a time, a pattern dividing unit to divide the pattern bitmap data into a first region having the size appropriate for the data processing unit and a second region having a second size not appropriate for the data processing unit, and a pattern handler to write and/or read the pattern bitmap data in and/or from the memory, wherein the first region is read and written according to the data processing unit, and the second region is read and written according to a unit smaller than the data processing unit.

The pattern arrangement unit may arrange the pattern bitmap data in a multiple of the data processing unit and the data processing unit is one of a 4-byte unit and 8-byte unit.

The pattern arrangement unit may further comprise an arrangement size calculator to calculate a least common multiple of a size of the pattern bitmap data and a size of the data processing unit as an arrangement size, and the pattern arrangement unit arranges the pattern bitmap data based on the least common multiple calculated by the arrangement size calculator as the arrangement size.

The first region may comprise a body region having a size corresponding to a multiple of the data processing unit.

The first region may comprise a body region, and the second region may comprise at least one region of an initial region formed at a front of a head region and having a bit unit, a head region formed at a front of the body region and having at least 1-byte unit, an end region formed at a rear of a tail region and having the bit unit, and the tail region formed at a rear of the body region and having at least 1-byte unit.

The pattern handler may read and write the body using processing unit, the initial and the end regions using a bit unit, and the head and the tail regions using a byte unit.

The foregoing and/or other aspects of the present general inventive concept may be achieved by providing a method of processing pattern bitmap data for a printer, the method comprising extracting a pattern bitmap data stored in a memory, arranging the pattern bitmap data in a size appropriate for a processing unit out of a plurality of processing units to process the extracted pattern bitmap data at one time, dividing the pattern bitmap data into a first region having the size appropriate for the processing unit, and a second region having a size not appropriate for the processing unit, and processing the pattern bitmap data to read or write the first region according to the processing unit, and to read or write the second region according to a unit having the second size smaller than the processing unit.

The foregoing and/or other aspects of the present general inventive concept may also be achieved by providing a processing system usable with an image forming apparatus, the processing system comprising a memory to store pattern bitmap data, and a pattern bitmap data processing unit to write the pattern bitmap data in the memory according to a processing unit which comprises a first processing unit and a second processing unit.

The foregoing and/or other aspects of the present general inventive concept may also be achieved by providing a processing system usable with an image processing forming apparatus, the processing system comprising a memory to store pattern bitmap data, and a pattern bitmap data processing system to read the pattern bitmap data from the memory according to a processing unit which comprises a first processing unit and a second processing unit.

The foregoing and/or other aspects of the present general inventive concept may also be achieved by providing a processing system usable with an image forming apparatus, the processing system comprising a memory to store pattern bitmap data, and a pattern bitmap processing unit to write and read the pattern bitmap data in and from the memory according to a first processing unit and a second processing unit.

The foregoing and/or other aspects of the present general inventive concept may also be achieved by providing a print data processing apparatus usable with a printer, the apparatus comprising an input module to receive print data from an external device, to decode the received print data, and to generate pattern bitmap data, a pattern bitmap processing system comprising a memory to store pattern bitmap data, and a pattern bitmap processing unit to write and read the pattern bitmap data in and from the memory according to a first processing unit and a second processing unit, and a graphic processor to generate a bitmap corresponding to the pattern bitmap data using the decoded print data, and the pattern bitmap data provided by the pattern bitmap processing system.

The foregoing and/or other aspects of the present general inventive concept may be achieved by providing a computer readable medium containing executable code of a method to control storing and extracting a pattern bitmap data from a printer memory, the executable codes comprising a first executable code to extract a pattern bitmap data stored in a memory, a second executable code to arrange the pattern bitmap data in a size appropriate for a processing unit to process the extracted pattern bitmap data at one time, a third executable code to divide the pattern bitmap data into a first region having the size appropriate for the processing unit, and a second region having a second size not appropriate for the processing unit, and a fourth executable code to process the pattern bitmap data to read or write the first region according to the processing unit, and to read or write the second region according to a unit having the second size smaller than the processing unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 5 is a flow chart illustrating a method of processing pattern bitmap data according to an embodiment of the present general inventive concept.

DETAILED DESCRIPTION OF THE PREFERRED EMBODIMENTS

Figure 1:
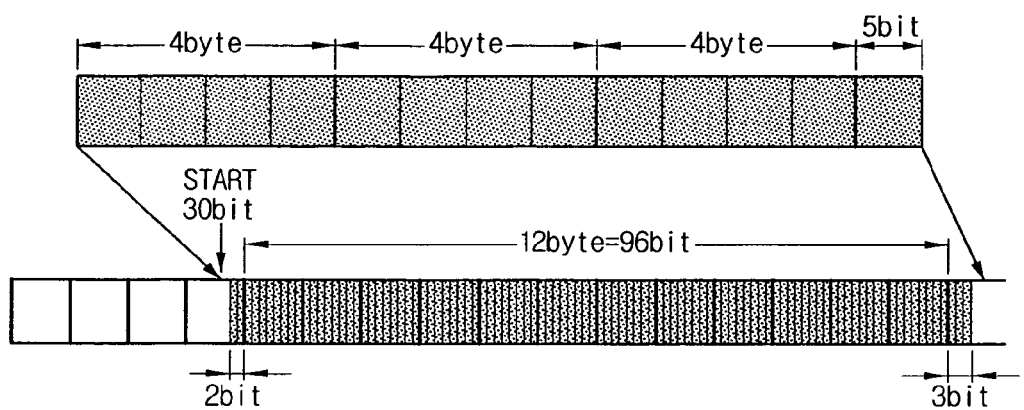
FIG. 1 is a view illustrating pattern bitmap data in a conventional rasterizing process.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Generally, when print data is provided to a printer, the printer transforms the print data into a printer inner language, and then transforms the print data of the printer inner language into bitmap data of a printable state.

First, an interpreter uses a command parser to transform the print data into the printer inner language, and divides the print data of the printer inner language appropriately for processing in a decoder. The print data in the printer inner language is then decoded by the decoder to generate a source image, a pattern, a destination and a Raster Operation (ROP) to be transformed in a bitmap format.

The decoded data is again transformed into a bitmap format by a graphic processor. When the source image and destination are transformed into a source image bitmap and a destination bitmap, respectively, a pattern bitmap (also referred to as pattern bitmap data) corresponding to the pattern is extracted from a memory and logically operated along with the source image bitmap and the destination bitmap.

A pattern bitmap data processing system to extract a pattern bitmap from a memory and to provide the extracted pattern bitmap to a graphic processor is described below.

Figure 2:
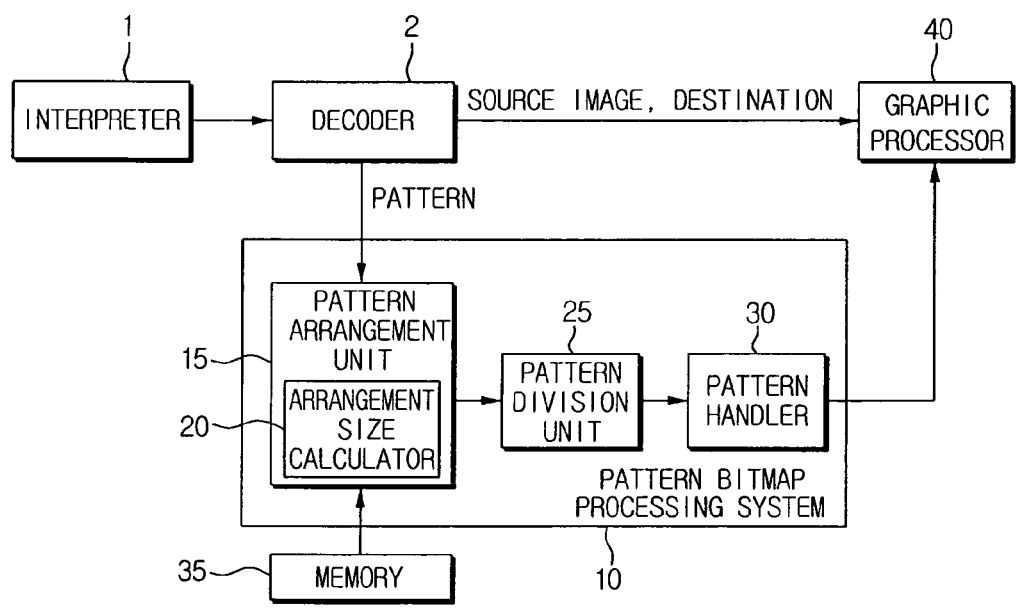
FIG. 2 is a block diagram illustrating a pattern bitmap data processing system according to an embodiment of the present general inventive concept.

FIG. 2 is a block diagram of a pattern bitmap data processing system 10 to store and extract pattern bitmap data (or bitmap data) in/from a memory 35 according to an embodiment of the present general inventive concept. The pattern bitmap processing system 10 may communicate with an interpreter 1, a decoder 2, and a graphic processor 40. The interpreter 1, the decoder 2, the graphic processor 40, the memory 35, and the pattern bitmap processor system 10 may be collectively called a pattern bitmap processing system usable with an image forming apparatus.

As illustrated in FIG. 2, the pattern bitmap data processing system 10 includes a pattern arrangement unit 15, a pattern division unit 25 and a pattern handler 30.

The pattern arrangement unit 15 serves to arrange the pattern bitmap extracted from the memory 35 into processing units having predetermined sizes. Data having a predetermined size denotes a processing unit that is stored or extracted in an operation when the pattern bitmap is stored in or extracted from the memory 35. The processing unit may be a 4-byte processing unit, an 8-byte processing unit and the like, and as the processing unit is larger, a larger capacity of the memory 35 is needed to process the pattern bitmap.

The pattern bitmap may be arranged per 4-byte processing units or 8-byte processing units in the pattern arrangement unit 15, since pattern bitmaps designed by a printer developer or pattern bitmap stored by a user in the memory 35 can have different sizes, the pattern bitmaps may not be multiples of 4 bytes or 8 bytes which is a processing unit size.

For example, if a size of a pattern bitmap is 14 bytes, the width of the pattern bitmap may be not a multiple of 4 bytes or 8 bytes, which is the processing unit size, and therefore it is difficult to divide the pattern bitmap using the pattern division unit 25.

Consequently, a pattern bitmap should be arranged as to be processed as a multiple of a 4-byte length or an 8-byte length that can be stored or extracted from the memory in one operation. For that purpose, the pattern arrangement unit 15 is provided with an arrangement size calculator 20 to calculate a least common multiple of the pattern bitmap size and a processing unit size. The size of a pattern bitmap may be a width and/or a height thereof.

The arrangement size calculator 20 calculates the least common multiple relative to a size of the pattern bitmap and the processing unit size, such as 4 bytes or 8 bytes. The least common multiple thus calculated is an arrangement size of the pattern bitmap.

For example, if the size of a pattern bitmap is 14 bytes and the processing unit size is 4 bytes, a least common multiple for 14 and 4 is 28 such that the pattern bitmap should be so arranged as to make the arrangement size 28 bytes. As a result, the pattern arrangement unit 15 arranges the pattern map to form 4 different patterns in one bundle per width and height. The different patterns may represent 4 different processing units.

Figure 3:
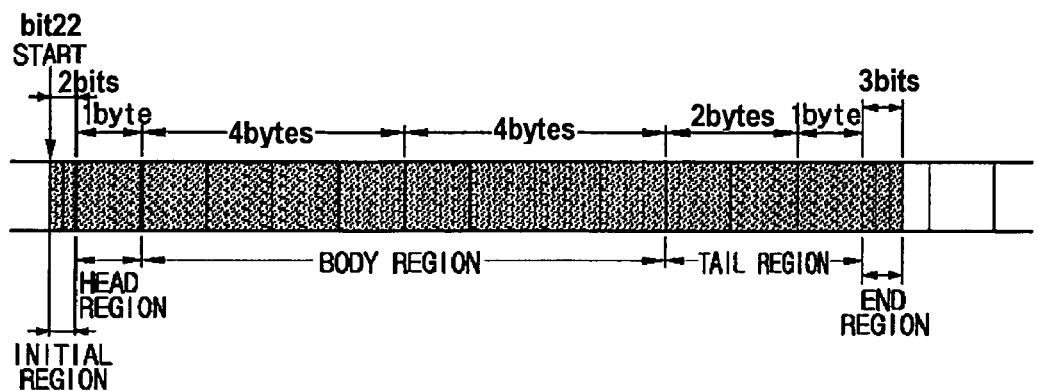
FIG. 3 is a view illustrating pattern bitmap data divided by a pattern bitmap data processing system according to an embodiment of the present general inventive concept.

The pattern division unit 25 arranges the pattern bitmaps arranged by the pattern arrangement unit 15 based on a predetermined start position, and divides the pattern bitmap into a first region arranged to a position corresponding to the processing unit, and a second region having a size smaller than that of the processing unit. The first region, which is a body region of FIG. 3, is a region formed in a size multiple of 4 bytes, 8 bytes or the like which is the size of the processing unit.

The second region is a region formed at a front and a rear of the body region excluding the body region itself. The second region is also a region formed in smaller units than the processing unit of 4 bytes or 8 bytes, for example, the second region may have a byte unit and/or a bit unit, for example, 1 byte, 2 byte, 3 byte and bit units.

A region formed in one or more byte units smaller than the processing unit in front of the body region is called a head region formed in a pattern size less than a processing unit of 4-byte or 8-byte. A region formed in bit units in front of the head region is called an initial region.

In other words, the head region, in a case of a processing unit of 4 bytes, may have a size of 1-byte, 2 bytes and 3 bytes, and in a case of processing unit of 8 bytes, the head region may have a size of 1 byte to 7 bytes. The initial region may have a size of 1-bit to 7 bits, which is less than 1-byte.

Meanwhile, a region formed in one or more byte units but smaller than the processing unit behind the body region is called a tail region formed in pattern sizes less than the processing unit but equal to or greater than the byte unit, and a region formed behind the tail region is referred to as an end region which is formed in pattern size of bit unit.

In other words, the tail region may have 1 byte to 3 bytes in a case of the processing unit of 4 bytes, and may have 1 byte to 7 bytes in a case of the processing unit of 8 bytes. The end region may have a size of 1 bit to 7 bits as in the case of the initial region.

If a pattern bitmap having a total length of 12 bytes and 5 bits and stored starting from bit 22 which represents 22nd bit with respect to a reference in the memory as a starting position, the pattern bitmap is divided first into a processing unit of 4 bytes, as illustrated in FIG. 3. Central 8 bytes are determined as a body region because the body region covers 2 processing units of 4 bytes. Since the start position is the bit 22, before the beginning of a processing unit of 4 bytes after the start position it is determined that there are 10 bits (that is a difference between a processing unit length of 4 bytes=32 bits and a length in bits corresponding to the start position, 32 bits-22 bits=10 bits). The 10 bits can be split in 1 byte (that covers 8 bits) and 2 bits. A length to be stored behind the body region is a difference between the total length of the pattern bitmap and a length stored up to an end of the body region (that is, 12 bytes+5 bits−8 bytes−1 byte−2 bits=3 bytes+3 bits). The 1 byte arranged in front of the body region and 3 bytes arranged behind of the body region are respectively formed in sizes smaller than 4 bytes and are determined as a head region and a tail region, respectively. The 2 bits in front of the head region and the 3 bits behind the tail region are smaller than 1 byte (i.e., 8 bits) and are determined as an initial region and an end region, respectively.

Although each pattern bitmap can be divided into five regions, such as the initial region, the head region, the body region, the tail region and the end region by the pattern division unit 25, the initial region, the head region, the tail region and the end region out of the five regions may be formed depending on the start position of the pattern bitmap, or may not be formed depending on the start position of the pattern bitmap. That is, according to a total size of a pattern bitmap and a start position of storing the pattern bitmap in the memory, the initial region, the head region, the tail region and the end region may have a size zero (i.e., are not formed).

Figure 4:
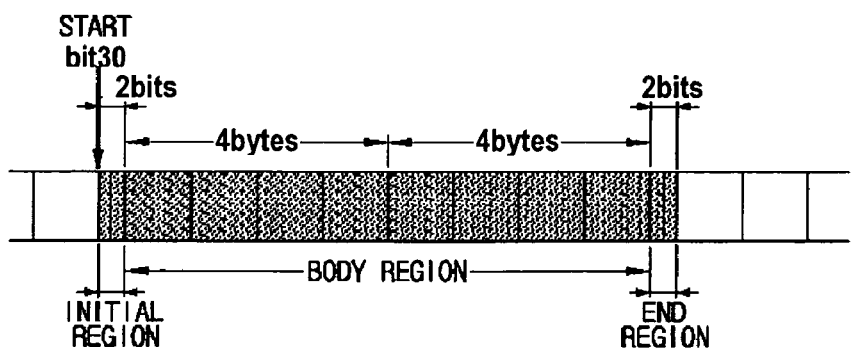
FIG. 4 is a view illustrating pattern bitmap data divided by a pattern bitmap data processing system according to another embodiment of the present general inventive concept.

For example, as illustrated in FIG. 4, if the total size of a pattern bitmap is 8 bytes and 4 bits, and an initial (start) position of the pattern bitmap is bit 30 which represents 30th bit from a reference as a recording starting position, a body region is made of central 8 bytes, an initial region is formed as front 2 bits and an end region is last 2 bits such that a head region and a tail region are not formed.

Meanwhile, the pattern handler 30 serves to store the pattern bitmap divided by the pattern division unit 25 in the memory 35, or to extract the pattern bitmap from the memory 35. When the pattern bitmap is stored or extracted, the pattern handler 30 executes different operations according to sizes of the 5 regions of the pattern bitmap divided by the pattern division unit 25.

Because the body region is a multiple of 4 bytes or 8 bytes which is a size of the processing unit, the pattern handler 30 stores or extracts the body region in operations using the processing units of 4 bytes or 8 bytes.

Consequently, for the pattern bitmap of FIG. 3, because the body region has 8 bytes, and if the processing unit has 4 bytes, the body region may be stored or extracted by repeating the same operation two times. An operation thus described is used to process (store or extract) the processing units of 4 bytes is called a double word operation.

The pattern handler 30 divides remaining data of the pattern bitmap into byte units corresponding to a head region and a tail region, such that if the processing unit has 4 bytes, the pattern handler can store in or extract from the memory a 1-byte unit, a 2-byte unit and a 3-byte unit.

An operation of the pattern handler 30 processing a 1-byte unit is called a byte operation, an operation processing a 2-byte unit is called a word operation and an operation processing 3-byte unit is called a byte and a word operation. A region of the pattern bitmap of 3 bytes is processed (stored or extracted) in two operations, that is, a 1-byte operation and a 2 byte operation. Meanwhile, because the initial region and the end region are divided into one or more bit units, the pattern handler 30 stores in and extracts from the memory (35) the initial region and the end region of the pattern bitmap in bit units.

When the pattern bitmap illustrated in FIG. 3 is stored or extracted by the pattern handler 30, the body region of 8 bytes is processed in two double word operations each operation of storing or extracting in the unit of 4 bytes, and the head region which has 1 byte is processed by a one byte operation. The tail region of 3 bytes is processed by a byte operation and a word operation, and the initial region is processed by repeating the same bit operation two times, and the end region is processed by repeating the same bit operation three times. As a result, the pattern bitmap can be stored or extracted by performing a total of 10 operation. Alternatively, if the tail region of 3 bytes is processed by 3 byte operations, the pattern bitmap is processed in a total of 11 operations.

A method of processing pattern bitmap data (that is, a pattern bitmap) that can be executed by the above-described pattern bitmap data processing system 10 is explained below with reference to FIGS. 2 and 5.

First, when print data is decoded, a pattern of the decoded print data is used to extract a pattern bitmap that is relevant from the memory 35 (operation S110). Then the arrangement size calculator 20 calculates a least common multiple relative to the processing unit of 4 bytes or 8 bytes, which is processible in one operation, and the size of the pattern bitmap, and the least common multiple is determined as an arrangement size (operation S120). The arrangement size thus calculated is used to arrange the pattern bitmap (operation S130).

When the pattern bitmap is thus arranged, the pattern division unit 25 divides the pattern bitmap into an initial region, a head region, a body region, a tail region, and an end region an arrangement state according to the arrangement and an initial position of the pattern bitmap in the memory 35 (operation S140).

Once the division of the pattern bitmap is completed, the pattern handler 30 conducts operations according to sizes of the respective regions of the pattern bitmap, and provides the pattern bitmap to the graphic processor 40 (operation S150). A similar method is applied to store a pattern bitmap generated by the graphic processor 40 in the memory 35.

As a result, the pattern handler 30 processes (that is, stores or extracts) the body region using double word operations, and the head region and the tail region are processed (i.e., stored or extracted) by executing byte operations or word operations alone or together depending on a size of the respective region, and the initial region and the end region are processed (stored or extracted) by executing the bit operations. When the pattern bitmap is stored in or extracted from the memory 35 using the methods described above, or provided to the graphic processor (40), the pattern bitmap of FIG. 3 can be processed by a total of 10 or 11 operations.

In the pattern bitmap processing system 10 described above, the pattern bitmaps are arranged per processing units of 4 bytes, 8 bytes and the like, and each of the arranged pattern bitmaps is divided into an initial region, a head region, a body region, a tail region, and an end region, whereby the pattern bitmaps are processed (stored in or extracted from the memory 35) by executing operations corresponding to sizes of each region.

In the conventional methods, if an initial position of storing a pattern bitmap is not the same as a start of a processing unit, the pattern bitmap is processed only by bit operations. However, according to various embodiments of the present general inventive concept, the pattern bitmaps can be processed by executing a variety of operations according to sizes of the divided pattern bitmaps to thereby enable to greatly reduce the number of operations. That is, a rendering time is shorten by executing storing and extracting operations using a prescribed unit larger than a bit unit.

For example, conventionally, in order to process the pattern bitmap illustrated in FIG. 3, a total of 101 bit operations are executed. However, according to an embodiment of the present general inventive concept, only 10 or 11 operations are needed. Consequently, a processing time of pattern bitmaps can be drastically reduced to thereby shorten the time consumed for an overall printing job.

In addition, because the pattern bitmaps are processed per byte unit by a Central Processing Unit (CPU) in the conventional system, bit operation had to be unavoidably executed in order to prevent occurrences of errors (exceptions) when two pattern bitmaps store data in a same byte unit. But according to various embodiments of the present general inventive concept, pattern bitmaps are processed by separate operations according to sizes of regions to thereby prevent the occurrences of errors (exceptions) in the CPU.

As apparent from the foregoing, there is an advantage in the pattern bitmap data processing system and method of processing pattern bitmap data for printer thus described according to embodiments of the present general inventive concept in that a processing time of pattern bitmaps is drastically reduced to thereby shorten the overall printing operations. There is another advantage in that occurrences of errors (exceptions) in a CPU can be prevented.

The embodiments of the present general inventive concept can also be embodied as computer readable codes on a computer readable recording medium. The computer readable recording medium may include any data storage device that can store data which can be thereafter read by a computer system. Examples of the computer readable recording medium include a read-only memory (ROM), a random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. The embodiments of the present general inventive concept may also be embodied in hardware or a combination of hardware and software. For example, the pattern bitmap processing system 10 may be embodied in software, hardware, or a combination thereof.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A pattern bitmap processing system of a printer using a pattern bitmap arrangement, the system comprising:
   a memory to store pattern bitmap data;
   a pattern arranging unit to arrange the pattern bitmap data in a size appropriate for a data processing unit in which the pattern bitmap data is processed at one time;
   a pattern dividing unit to divide the pattern bitmap data into a first region having the size appropriate for the data processing unit and a second region having a second size not appropriate for the data processing unit; and
   a pattern handler to write and/or read the pattern bitmap data in and/or from the memory,
   wherein the first region is read and written according to the data processing unit, and the second region is read and written according to a unit smaller than the data processing unit,
   wherein the first region comprises a body region, and the second region comprises at least one of a head region formed in front of the body region and having at least 1-byte unit, an initial region formed in front of the head region and having between 1 and 7 bit unit, a tail region formed at behind the body region and having at least 1-byte unit, and an end region formed behind the tail region and having the bit unit.

2. The system as defined in claim 1, wherein the pattern arrangement unit arranges the pattern bitmap data in a multiple of the data processing unit, and the data processing unit is one of a 4-byte unit and an 8-byte unit.

3. The system as defined in claim 2, wherein the pattern arrangement unit comprises:
   an arrangement size calculator to calculate a least common multiple of a size of the pattern bitmap data and a size of the data processing unit as an arrangement size, and the pattern arrangement unit arranges the pattern bitmap data based on the least common multiple calculated by the arrangement size calculator as the arrangement size.

4. The system as defined in claim 1, wherein the first region comprises a body region having a size corresponding to a multiple of the data processing unit.

5. The system as defined in claim 1, wherein the pattern handler reads and writes the pattern bitmap data according to the data processing unit in the body region, and a bit unit in the initial and the end regions, and a byte unit in the head and the tail regions.

6. A method of processing a pattern bitmap of a printer using a pattern bitmap arrangement, the method comprising:
   extracting a pattern bitmap data stored in a memory;
   arranging the pattern bitmap data in a size appropriate for a processing unit to process the extracted pattern bitmap data at one time;
   dividing the pattern bitmap data into a first region having the size appropriate for the processing unit, and a second region having a second size not appropriate for the processing unit; and
   processing the pattern bitmap data to read or write the first region according to the processing unit, and to read or write the second region according to a unit having the second size smaller than the processing unit,
   wherein the second region comprises at least one of a head region formed in front of a body region; and having at least 1-byte unit, an initial region formed in front of the head region and having a bit unit, a tail region formed behind the body region and having at least 1-byte unit, and an end region formed behind the tail region and having a bit unit.

7. The method as defined in claim 6, wherein the arranging of the pattern bitmap data comprises arranging the pattern bitmap data according to a size corresponding to at least one of 4-byte and 8-byte units.

8. The method as defined in claim 7, further comprising:
   calculating a least common multiple of a size of the pattern bitmap data and a size of the data processing unit, and
   wherein the arranging of the bitmap data comprises arranging the pattern bitmap data by using the least common multiple as an arrangement size.

9. The method as defined in claim 6, wherein the first region comprises a body region having a size corresponding to a multiple of the processing unit.

10. The method as defined in claim 6, wherein the processing of the pattern bitmap data comprises reading and writing the body region according a per processing unit, the initial and end regions according a per bit unit, and the head and tail regions according to a byte unit.

* * * * *